Sept. 9, 1941.   A. B. ELLERY   2,255,381
WARNING SIGNAL FOR MOTOR VEHICLES
Filed Oct. 21, 1939
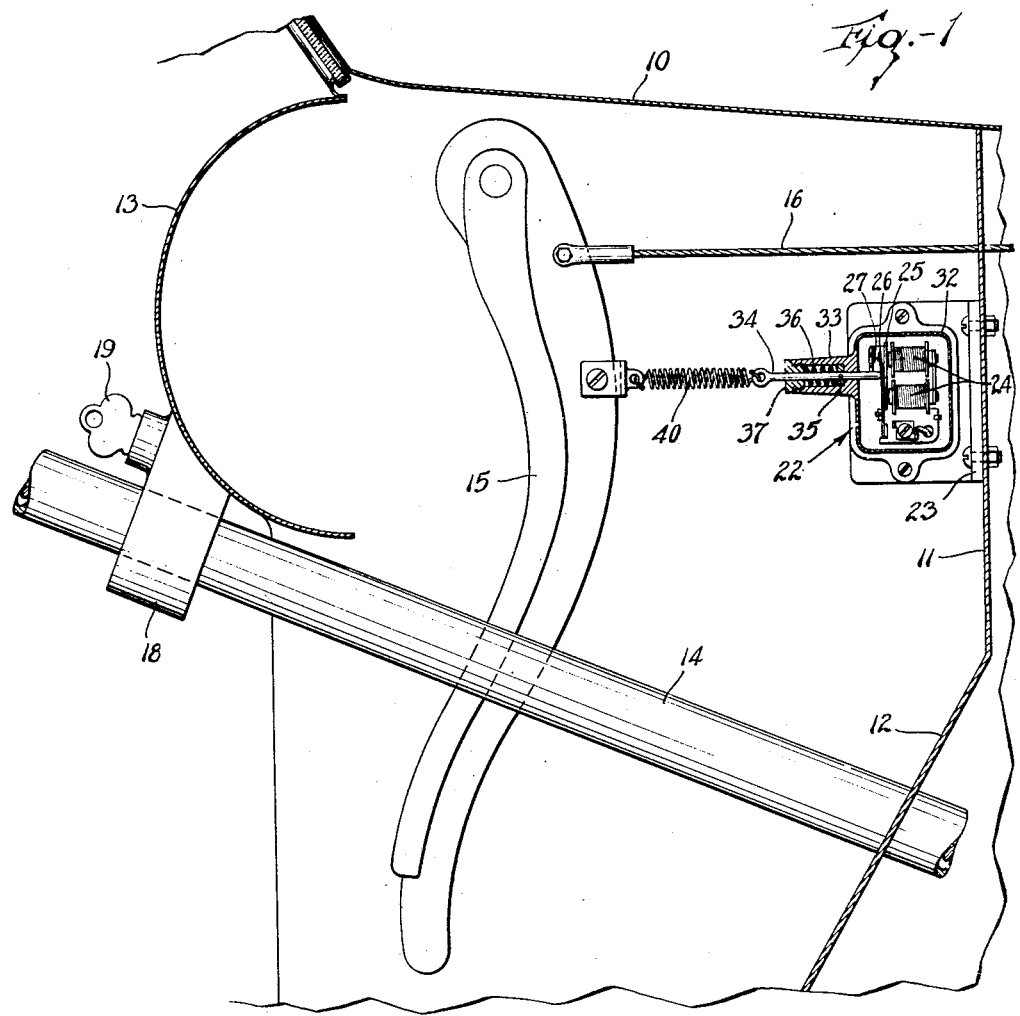
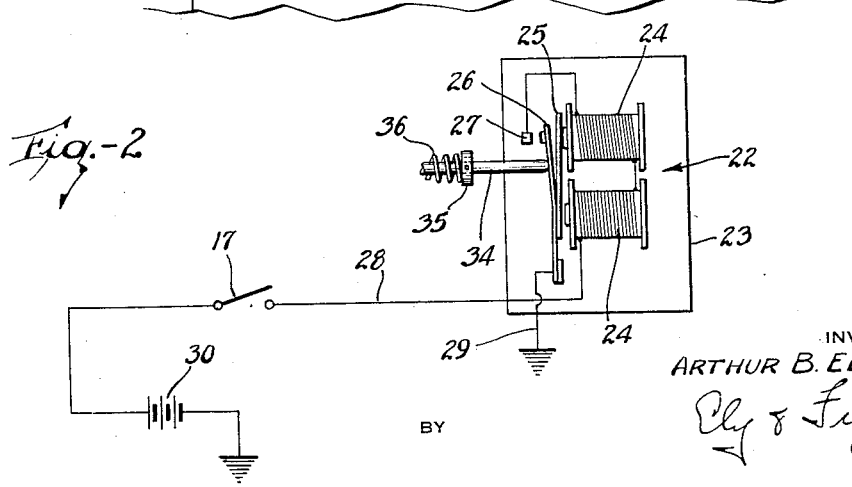
INVENTOR
ARTHUR B. ELLERY
BY
ATTORNEYS Patented Sept. 9, 1941

2,255,381

UNITED STATES PATENT OFFICE 2,255,381

WARNING SIGNAL FOR MOTOR VEHICLES

Arthur B. Ellery, Akron, Ohio

Application October 21, 1939, Serial No. 300,597

2 Claims. (Cl. 177—311)

This invention relates to warning signals for motor vehicles, and more especially it relates to signals for warning the operator of a motor vehicle whenever the brakes are set at the same time that the ignition is "on" or in operative condition.

The braking apparatus of a modern motor vehicle usually is provided with a hand-operated lever by means of which the brakes may be set or applied and retained in set condition until manually released, as when the vehicle is parked, especially on a grade. It is common experience for the operators of such vehicles subsequently to start or attempt to start the vehicle with the parking brake still applied with the result that undue strain is placed upon the motor of the vehicle, and the brake-linings subjected to excessive friction and wear. Furthermore, it sometimes happens that the operator, after stopping the vehicle and applying the parking brake, will leave the vehicle without turning off the ignition, thus resulting in unnecessary drain upon the battery. It is to the relief of these conditions that this invention is directed.

Accordingly it is the chief object of the invention to provide a warning signal that functions automatically whenever the parking brakes are set and the ignition is on. More specifically the invention aims to provide an electrically operated warning signal that is operatively connected to the ignition system of the motor vehicle, including means connected to the manually operated lever of the braking system for rendering the warning signal operative or inoperative. Other objects will be manifest as the description proceeds.

The invention may be embodied in a visible or an audible signal, but for the purpose of illustration only an audible signal will be shown and described herein.

Of the accompanying drawing:

Figure 1 is a fragmentary sectional view through that portion of a motor vehicle occupied by the operator, showing the improved warning signal, a part thereof being broken away and in section; and Figure 2 is a wiring diagram of the electrical elements of the device.

Referring first to Fig. 1 of the drawing, there is shown a fragmentary interior of a motor vehicle comprising cowl 10, partition 11, footboard 12, instrument panel 13, steering post 14, a manually operable parking brake lever 15, and a cable 16 connected to the latter and extending through the partition 11 to connect with the braking system (not shown). An ignition switch 17, Fig. 2, is located in a bracket 18 that is connected to the instrument panel 13 and steering post 14, said switch being operated by means of a key 19.

The warning signal herein shown is of the electrically operated audible variety. More specifically, it is of the vibratory type known as a buzzer, the same being designated as a whole by the numeral 22. Said buzzer is mounted upon a suitable bracket 23, the latter as shown being secured to the vertical partition 11, directly in front of the parking brake lever 15. The buzzer 22 comprises the usual coils 24, 24 and armature 25, the latter being carried by a flat contact spring 26 that is adapted intermittently to make contact with a terminal post 27 when the buzzer is energized and the armature is vibrating, for making and breaking the electrical circuit through the buzzer during normal operation thereof. As shown in Fig. 2, the buzzer is electrically connected to the ignition system of the vehicle by conductor 28 that connects with said system through the agency of the switch 17, said buzzer also being connected to ground on the frame of the vehicle by means of conductor wire 29. Battery for energizing the ignition system and the buzzer is indicated at 30.

Operatively associated with the buzzer is means for rendering the same operative or inoperative in determinate relation to the position of the brake lever 15. To this end the buzzer is provided with a removable cover or casing 32 that is formed on the side thereof nearest the lever 15 with an axially apertured boss or extension 33 in which is slidably mounted a rod or plunger 34, one end of said plunger projecting into the interior of the casing, the other end being disposed exteriorly thereof and formed with an eye. The boss 33 is counterbored from its outer end, and within said counterbore a collar 35 is secured upon the plunger 34. Also mounted in said counterbore is a compression spring 36 that encircles the plunger, one end of said spring abutting the collar 35, the other end abutting a cap 37 threaded into the outer end of the counterbore. The arrangement is such that the spring 36 normally urges the plunger 34 axially, inwardly of the casing 32. The plunger in its innermost position engages the contact spring 26 and holds the latter out of possible contact with the terminal post 27, with the result that operation of the buzzer is prevented.

For withdrawing the plunger 34 from engagement with the contact spring 26, against the pressure of spring 36, a tension spring 40 is connected at one end to the eye on the outer end of the plunger 34, and at its other end is connected to the brake lever 15. The spring 40 is stronger than the spring 36, the arrangement being such that when the operator of the vehicle sets the brakes by drawing the free end of the lever 15 toward him, (toward the left as shown in Fig. 1), the spring 40 first effects the withdrawal of the plunger 34 from engagement with contact spring 26, against the force of spring 36, and thereafter elongates to compensate for the excess of movement of the lever as compared to the axial movement of the plunger. Release of the contact spring 26 as described enables it to make contact with the terminal post 27, and, if the ignition is "on," the buzzer will start to sound its warning. Release of the brake lever 15 will restore the elements to the original position described and thus again render the buzzer inoperative. Also the turning off of the ignition will stop the operation of the buzzer.

It is believed that the operation of the invention will be understood from the foregoing description of its construction. The buzzer operates automatically to sound its warning whenever the parking brake is set and the ignition is "on." The invention is of simple construction, it is applicable to substantially all modern motor vehicles, and it achieves the other advantages set out in the foregoing statement of objects.

Modification may be resorted to without departing from the spirit of the invention, or the scope thereof as defined by the appended claims.

What is claimed is:

1. In a warning signal for motor vehicles, the combination of an electric buzzer, means common to the buzzer and to the ignition system of the vehicle for concurrently energizing them, a spring pressed plunger normally extending into engagement with a vibratory member of the buzzer adapted to prevent operation of the latter when the ignition system is energized, a hand-operated lever for applying the brakes to the vehicle, and means connecting said lever to said plunger for withdrawing the latter from engagement with said vibratory member whenever the brakes are applied by means of said lever.

2. In a warning signal for motor vehicles, the combination of an electric buzzer, means common to the buzzer and to the ignition system of the vehicle for concurrently energizing them, a plunger, a spring normally urging said plunger into engagement with a vibratory member of the buzzer and adapted to prevent operation of the latter when the ignition system is energized, a hand-operated lever for setting the brakes of the vehicle, and a spring, of greater strength than the first mentioned spring, connecting said lever to said plunger for withdrawing the latter from engagement with said vibratory member whenever the brakes are set by means of said lever.

ARTHUR B. ELLERY.